United States Patent [19]
Rains

[11] Patent Number: 6,017,462
[45] Date of Patent: Jan. 25, 2000

[54] PLASTER TRAPPING SINK LINER

[76] Inventor: Michael D. Rains, 2962 Mindanao Dr., Costa Mesa, Calif. 92626

[21] Appl. No.: 09/212,824

[22] Filed: Dec. 15, 1998

Related U.S. Application Data

[60] Provisional application No. 60/069,913, Dec. 17, 1997.

[51] Int. Cl.[7] .................................................. B01D 21/02
[52] U.S. Cl. .................................. 210/801; 4/654; 4/657
[58] Field of Search ..................................... 210/800, 801; 4/654, 657

[56] References Cited

U.S. PATENT DOCUMENTS

| | | |
|---|---|---|
| 357,349 | 2/1887 | Waring, Jr. . |
| 403,030 | 5/1889 | Bauer . |
| 1,411,684 | 4/1922 | Debney . |
| 2,071,160 | 2/1937 | Boosey ........................................ 210/56 |
| 2,237,545 | 4/1941 | Boosey ........................................ 210/56 |
| 2,432,203 | 12/1947 | Miller .......................................... 182/2 |
| 2,467,547 | 4/1949 | Birnbaum . |
| 3,289,218 | 12/1966 | Mehilos . |
| 4,263,934 | 4/1981 | Redden et al. . |
| 4,351,073 | 9/1982 | Elsas ............................................ 4/654 |
| 4,983,295 | 1/1991 | Lamb ........................................ 210/521 |

FOREIGN PATENT DOCUMENTS

| | | |
|---|---|---|
| 658252 | 6/1929 | France . |
| 896 528 | 2/1945 | France ................................... 210/532.1 |
| 72005 | 5/1893 | Germany . |
| 3514897 A1 | 11/1986 | Germany . |
| 91294 | 3/1992 | Switzerland . |

*Primary Examiner*—Robert J. Popovics
*Attorney, Agent, or Firm*—Eric Karich

[57] ABSTRACT

A sink liner apparatus and a method for using the apparatus for removing plaster from waste water has a catch basin to catch the waste water contaminated with plaster and direct it into a sedimentation basin. The sedimentation basin allows the plaster to precipitate into the sedimentation basin, which can be periodically cleaned or replaced. The waste water overflows through a sedimentation basin draining aperture into a sink basin. The sink basin supports the sedimentation basin and also directs the waste water into a sink draining aperture for separate disposal.

3 Claims, 3 Drawing Sheets

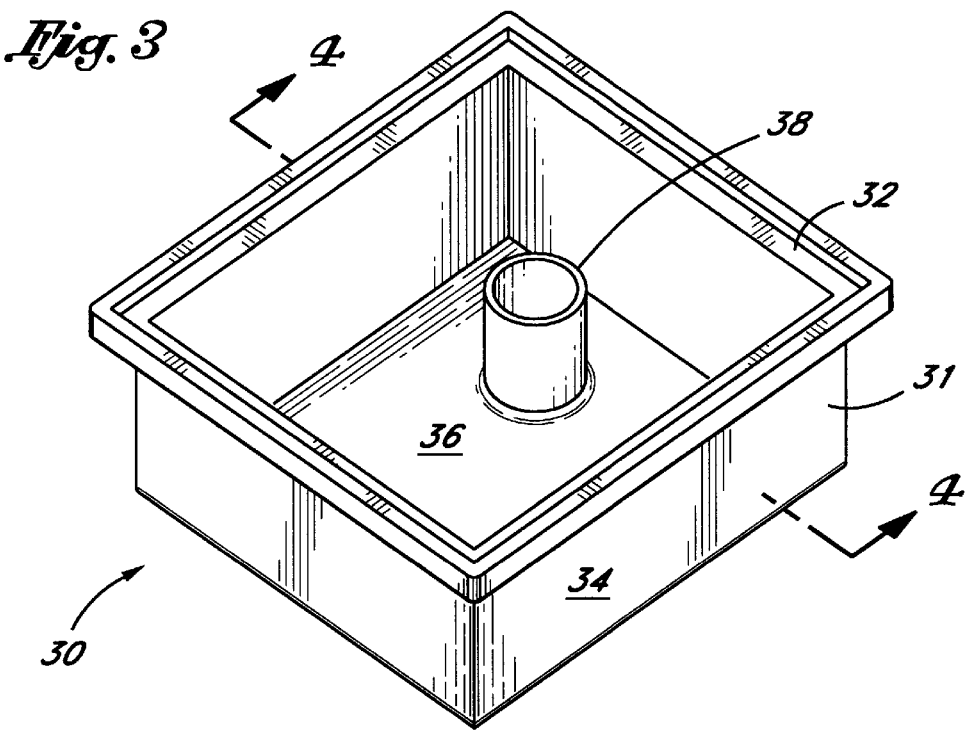
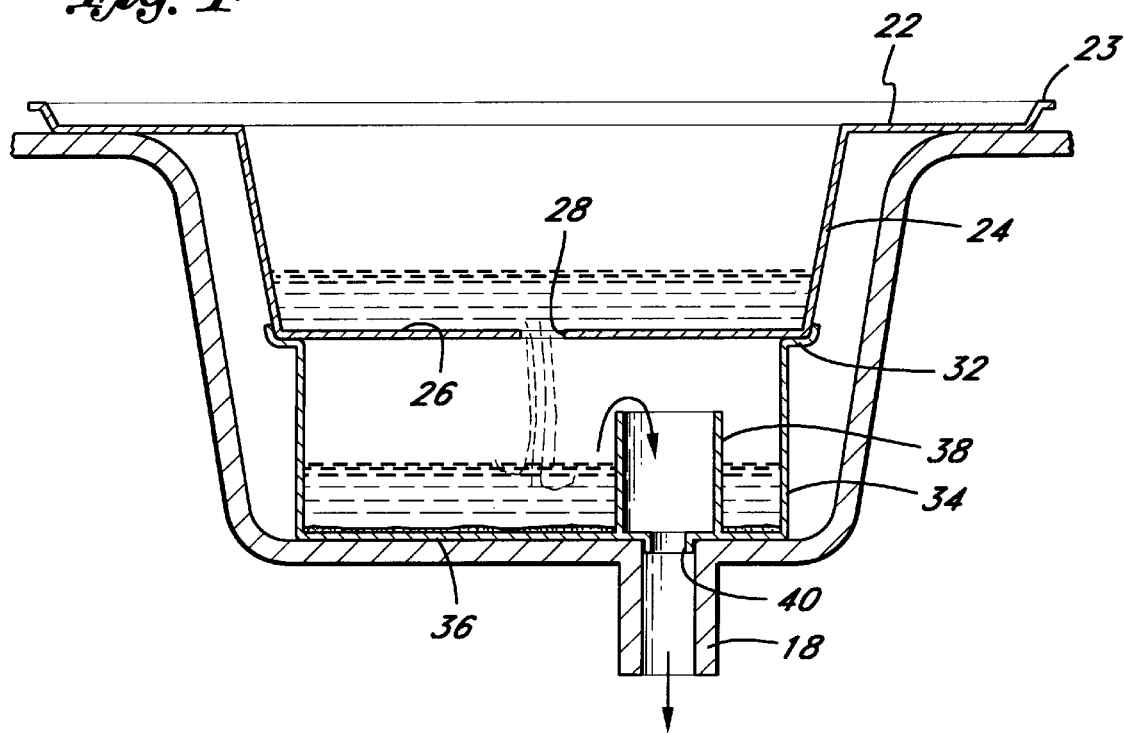

PLASTER TRAPPING SINK LINER

This application for a utility patent follows a previously filed provisional patent having the serial number 60/069,913 and a filing date of Dec. 17, 1997.

BACKGROUND OF THE INVENTION

1. Field of the Invention

This invention relates generally to devices used to remove contaminants from waste water, and more particularly to a sink liner that removes plaster from waste water.

2. Description of Related Art

Various devices have been developed to remove contaminants from waste water. Bauer, U.S. Pat. No. 403,030, discloses a water tank for grinding machines, the water tank providing a sedimentation tank that allows waste water to drain from the top of the tank. Gappisch, German Patent No. 72005 discloses a pair of sedimentation tanks. Waring, U.S. Pat. No. 357,349, discloses three horizontally spaced sedimentation tanks for use as a grease trap. Various other drains and traps for general use are disclosed in various other prior art references.

In the field of dentistry, there is often a need to remove plaster from waste water. In the prior art, plaster is removed from waste water with a device known as a plaster trap. A plaster trap is a large bucket that is attached to the plumbing under a sink, the bucket being designed to separate plaster from waste water. Unfortunately, a plaster trap is difficult to install and it must be replaced or cleaned periodically. Replacing or cleaning a plaster trap is a difficult and messy job.

The prior art teaches a plaster trap for removing plaster from waste water. However, the prior art does not teach a device that fits into a sink that removes plaster from waste water. The described sink liner may be used in place of a plaster trap, or it may be used as an initial sedimentation stage that removes a large portion of the plaster, thereby extending the life of a plaster trap. The present invention fulfills these needs and provides further related advantages as described in the following summary.

SUMMARY OF THE INVENTION

The present invention teaches certain benefits in construction and use which give rise to the objectives described below.

A sink liner apparatus and a method for using the apparatus for removing plaster from waste water has a catch basin to catch the waste water contaminated with plaster and direct it into a sedimentation basin. The sedimentation basin allows the plaster to precipitate into the sedimentation basin, which can be periodically cleaned or replaced. The waste water flows out of the sedimentation basin through a sedimentation basin draining aperture into a means for directing the waste water into a sink draining aperture. The means for directing is preferably a sink basin. The sink basin supports the sedimentation basin and also directs the waste water into a sink draining aperture for separate disposal.

A primary objective of the present invention is to provide a sink liner apparatus having advantages not taught by the prior art.

Another objective is to provide a sink liner apparatus having a sedimentation basin that separates plaster from waste water and contains the plaster within the sedimentation basin, the sedimentation basin then being easily cleaned or replaced with an inexpensive replacement.

A further objective is to provide a sink liner apparatus that is inexpensive and easy to install, the installation not requiring any modifications to the original plumbing.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings:

FIG. 3 is a perspective view of an alternative embodiment of the sedimentation basin; and FIG. 4 is a sectional view thereof taken along line 4—4 in FIG. 3, showing the alternative sedimentation basin positioned under the catch basin in the sink.

DETAILED DESCRIPTION OF THE INVENTION

Figure 1:
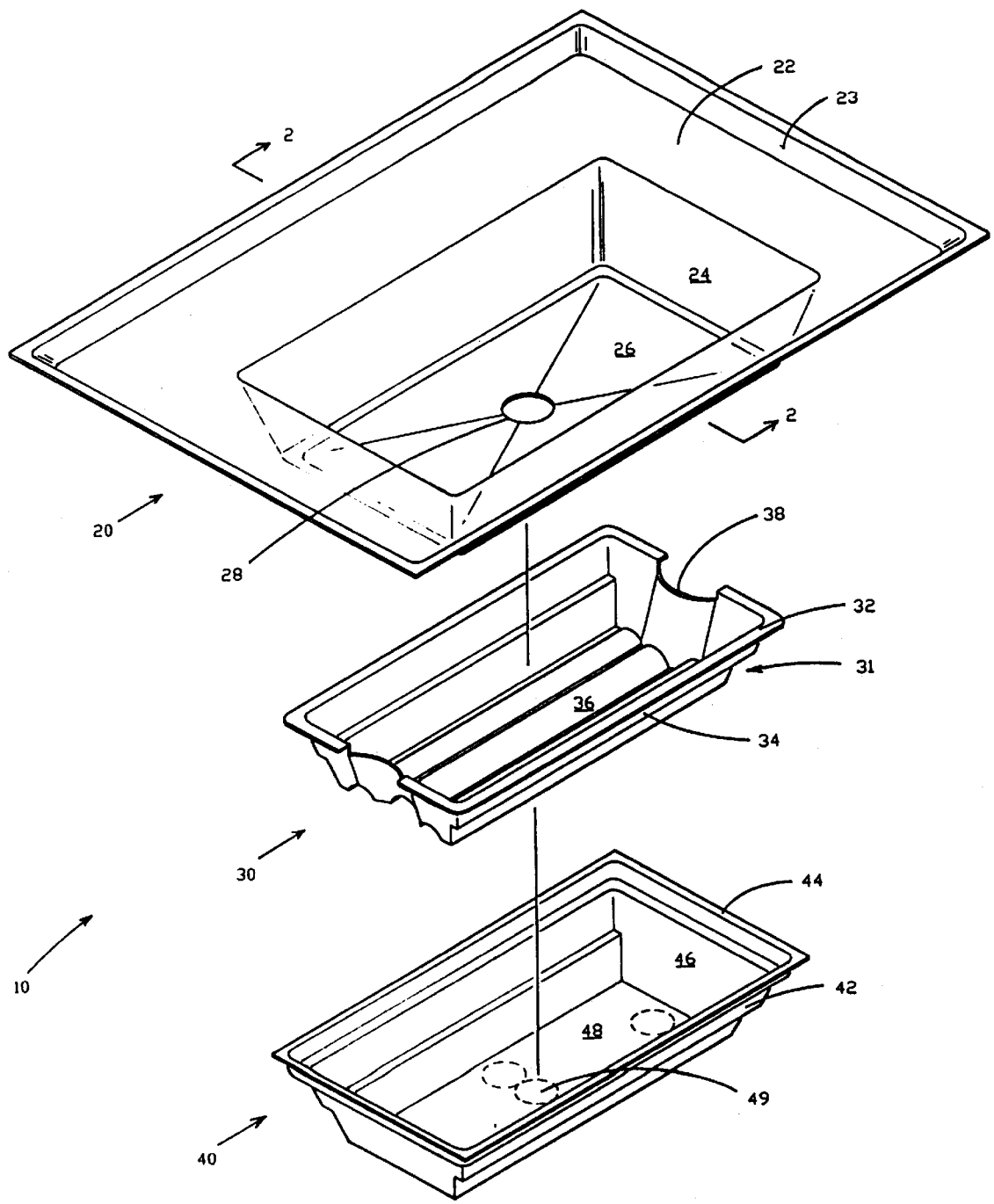
FIG. 1 is a perspective exploded view of the preferred embodiment of the present invention.

The above described drawing figures illustrate the invention, a sink liner apparatus 10 for separating non-buoyant solid materials such as plaster from liquids such as waste water. The apparatus 10 includes a catch basin 20 to catch the waste water and the plaster and direct it into a sedimentation basin 30. Once in the sedimentation basin 30, the plaster precipitates from the waste water and is trapped in the sedimentation basin 30 for easy disposal. The waste water then flows out of the sedimentation basin 30 through a sedimentation basin draining aperture 38. The apparatus 10 preferably includes a means for directing 40 the waste water from the sedimentation basin draining aperture 38 to a sink draining aperture 18 of a sink 16. The means for directing 40 the waste water is preferably a sink basin 40. The sink basin 40 supports the sedimentation basin 30 and also directs the waste water into a sink draining aperture 18 for separate disposal.

Figure 2:
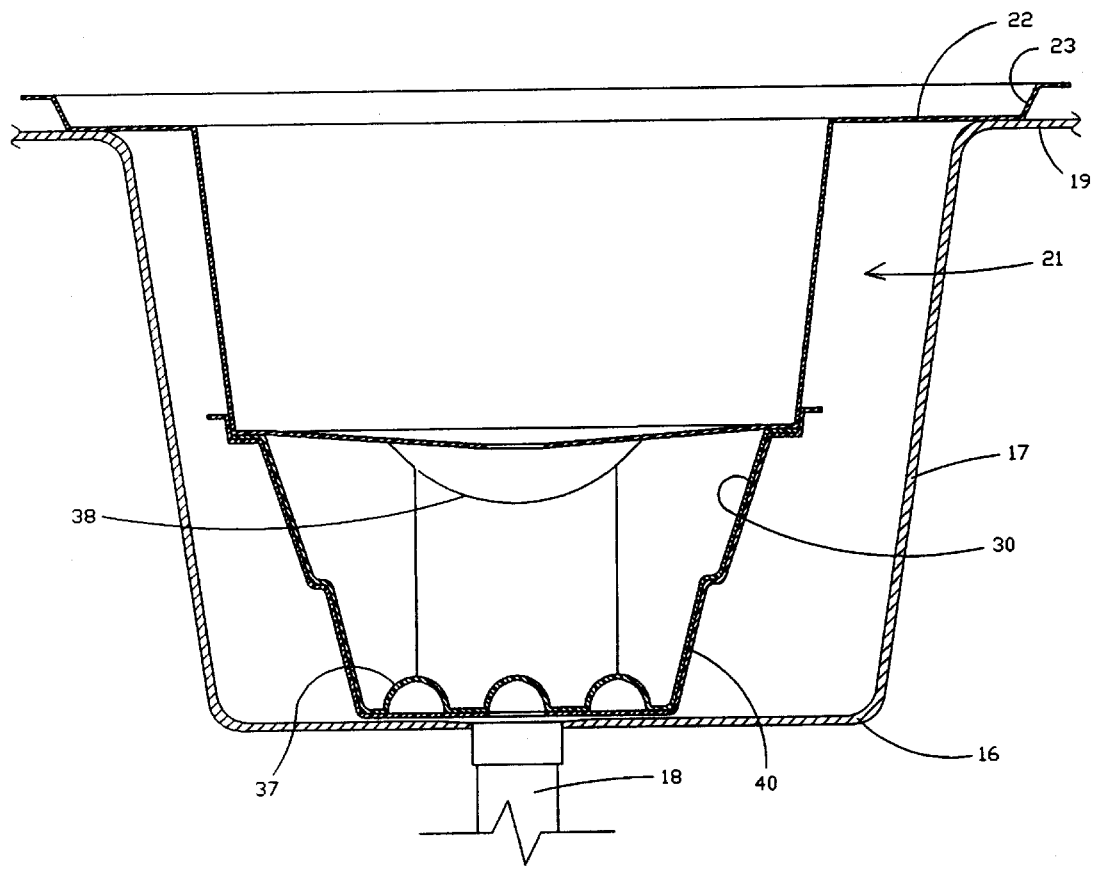
FIG. 2 is a sectional view thereof taken along line 2—2 in FIG. 1, showing the invention assembled and placed into a sink.

As shown in FIGS. 1 and 2, the catch basin 20 has a catch basin well 21. The catch basin well 21 has an upwardly directed catch basin side wall 24. The catch basin side wall 24 surrounds and contiguously joins with a catch basin bottom panel 26. The catch basin bottom panel 26 is preferably angled for directing waste water toward a catch basin draining aperture 28 therein. The catch basin 20 not only captures and directs the waste water and the plaster, it also provides a sink-like basin for general use, so the apparatus 10 does not deprive the user of sink space. The catch basin 20 preferably further includes a fluid containment apron 22 around the perimeter of the catch basin well 21. The fluid containment apron 22 allows the apparatus 10 to fit the sink 16 despite the fact that sinks differ widely in size. The fluid containment apron 22 also provides a work surface surrounding the sink 16. Anything falling onto the fluid containment apron 22 can be easily washed into the catch basin well 21. To facilitate cleanup, the fluid containment apron 22 further includes an apron lip 23 that prevents waste water from spilling off of the fluid containment apron 22 onto the counter surface 19. The catch basin 20 is made of a water impervious material, preferably a rigid plastic. The catch basin 20 is preferably large enough to cover the opening of the sink 16 and a portion of the counter surface 19 surrounding the sink 16. The catch basin well 21 is preferably sized to sit within a sink well 17 of the sink 16, and the fluid containment apron 22 is preferably large enough cover any typical size of sink, as described above, thereby adapting the apparatus 10 to sinks of different sizes and shaped.

As shown in FIGS. 1 and 2, the preferred embodiment of the sedimentation basin 30 provides a sedimentation basin well 31 and preferably further includes a support rim 32. The sedimentation basin well 31 has an upwardly directed sedimentation basin side wall 34. The sedimentation basin side wall 34 surrounds and contiguously joins a sedimentation basin bottom panel 36. The sedimentation basin 30 provides a sedimentation basin draining aperture 38 above the sedimentation basin bottom panel 36. In its preferred embodiment, the sedimentation basin draining aperture 38 is provided by a portion of the rim of the sedimentation basin side wall 34. As shown in FIGS. 3 and 4, in an alternative embodiment the sedimentation basin draining aperture 38 is provided by an cylindrical portion extending upwardly from the sedimentation basin bottom panel 36. In its preferred embodiment, the sedimentation basin bottom panel 36 is molded to further include a plurality of support ridges 37. The support ridges 37 not only strengthen the sedimentation basin 30, they also facilitate waste water drainage out of the sink basin 40 described below. The sedimentation basin 30 is preferably sized and shaped to fit within and substantially fill the sink basin 40. The sedimentation basin 30 is made of a water impervious material, preferably a rigid plastic; however, since the sedimentation basin 30 is preferably supported by the sink basin 40, the sedimentation basin 30 is preferably made of a thin and inexpensive plastic material.

In its preferred embodiment, as shown in FIGS. 1 and 2, the apparatus 10 further includes a means for directing 40 the waste water from the sedimentation basin draining aperture 38 to a sink draining aperture 18 of a sink 16. The means for directing 40 the waste water is preferably a sink basin 40. The sink basin 40 provides a sink basin well 42 and preferably further includes a support lip 44. The sink basin well 42 has an upwardly directed sink basin side wall 46. The sink basin side wall 46 surrounds and contiguously joins with a sink basin bottom panel 48. The sink basin bottom panel 48 is preferably angled for directing waste water toward a sink basin draining aperture 49 therein. The sink basin draining aperture 49 is preferably cut from the sink basin bottom panel 48 by the user, thereby allowing the user to custom position the sink basin draining aperture 49 directly over the sink draining aperture 18 of his or her sink 16. The support lip 44 is shaped to contact and support the support rim 32 of the sedimentation basin 30 as well as the catch basin well 21. The sink basin 40 is made of a water impervious material that is rigid enough to support the weight of the sedimentation basin 30 as well as the waste water passing through the sedimentation basin 30. The sink basin 40 is preferably made of a rigid plastic. The sedimentation basin 30 is sized to sit within a sink well 17 of the sink 16 and is preferably large enough to substantially fill the sink well 17. The sink basin 40 supports the sedimentation basin 30; and it also directs the waste water into the sink draining aperture 18 for separate disposal, thereby protecting the sink 16 from the staining and plaster-buildup that may otherwise be caused by allowing the waste water to drain into the bottom of the sink well 17.

In an alternative embodiment, as shown in FIGS. 3 and 4, the means for directing 40 the waste water from the sedimentation basin draining aperture 38 to a sink draining aperture 18 is a drain conduit. Such a drain conduit 40 can be provided in many various forms. The primary purpose of the drain conduit 40, as described above, is to transfer the waste water to the sink draining aperture 18, thereby protecting the sink 16 from the staining and plaster-buildup that may otherwise be caused by allowing the waste water to drain into the bottom of the sink well 17.

In use, the sink basin 40 is inserted into the sink well 17 of the sink 16. The sink basin bottom panel 48 is preferably initially provided with a plurality of indicia that direct the user to cut the sink basin draining aperture 49 to correspond to his or her sink draining aperture 19. Allowing the user to customize the location of the sink basin draining aperture 49 allows the apparatus 10 to direct the waste water directly into the sink basin draining aperture 49, thereby avoiding the staining and plaster-buildup that may otherwise be caused by allowing the waste water to drain into the bottom of the sink well 17. It also provides maximum drainage and avoids unnecessary pooled waste water within the sink 16. The sedimentation basin 30 is then inserted into the sink basin 40 such that the support rim of the sedimentation basin 30 is supported by the support lip of the sink basin 40. The support ridges 37 of the sedimentation basin bottom panel 36 prevent the sedimentation basin bottom panel 36 from blocking the drainage of the waste water from the sink basin 40 into to the sink 16.

The catch basin 20 is then positioned over the sedimentation basin 30 such that the catch basin bottom panel 26 preferably rests upon the support rim 32 of the sedimentation basin 30 and is supported by the support lip 44 of the sink basin 40. The fluid containment apron 22 preferably also is supported upon the counter surface 19 surrounding the sink 16. If necessary, the fluid containment apron 22 can be trimmed by the user to fit the sink 16. In this position, the waste water and the plaster contaminate that would ordinarily flow into the sink 16 instead flow into the catch basin 20, where it is directed into the sedimentation basin 30 through the catch basin draining aperture 28. In the sedimentation basin 30, the plaster or other non-buoyant solid materials tend to precipitate, settling into the sedimentation basin well 31. The waste water fills the sedimentation basin well 31 and overflows through the sedimentation basin draining aperture 38 and flows into the sink basin 40. The sink basin 40 directs the waste water through the sink basin draining aperture 49 to the sink draining aperture 18.

The apparatus 10 can be used to separate plaster from the waste water until the sedimentation basin 30 gets substantially full of plaster. At this point, the user simply lifts the catch basin 20 to expose the full sedimentation basin 30. Once the plaster has settled, the user decants the excess waste water from the sedimentation basin 30 and removes the sedimentation basin 30. At this point, the sedimentation basin 30 can either be cleaned or simply thrown away and replaced with a new sedimentation basin 30. By providing the above-described apparatus 10 to separate substantial amounts of plaster upstream of any plaster trap that may be in use, the life of the plaster trap can be substantially extended, avoiding unnecessary expense and messy changing of full plaster traps.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method for separating non-buoyant solid materials from liquids, the method comprising the steps of:
   a) providing a sink liner apparatus for separating non-buoyant solid materials from liquids, the apparatus comprising:
      a catch basin providing a catch basin well, the catch basin well having an upwardly directed catch basin side wall, the catch basin side wall surrounding and joining contiguously with a catch basin bottom panel;
      a sedimentation basin providing a sedimentation basin well, the sedimentation basin well having an upwardly directed sedimentation basin side wall, the sedimentation basin side wall surrounding and joining contiguously with a sedimentation basin bottom panel, the sedimentation basin providing a sedimentation basin draining aperture above the sedimentation basin bottom panel;
   b) providing a sink having a sink well, the sink well having an upwardly directed sink side wall, the sink side wall surrounding and joining contiguously with a sink bottom panel, the sink bottom panel having a sink draining aperture therein;
   c) cutting a sink basin draining aperture in the sink basin bottom panel directly above the sink draining aperture;
   d) positioning the sedimentation basin into the sink basin such that liquids overflowing from the sedimentation basin draining aperture flow into the sink draining aperture;
   e) positioning the catch basin over the sedimentation basin such that liquids escaping the catch basin draining aperture flow into the sedimentation basin; and
   f) directing a flow of liquids containing non-buoyant solid materials into the catch basin such that the liquids and the non-buoyant solid materials flow into the sedimentation basin, where the liquids flow into the sink and the non-buoyant solid materials sink to the bottom of the sedimentation basin and are trapped, for later disposal.

2. The method of claim 1 further comprising the steps of:
   b') providing a means for directing the waste water from the sedimentation basin draining aperture into a sink draining aperture; and
   c') operably positioning the means for directing between the sedimentation basin and the sink.

3. The method of claim 2 wherein the means for directing is a sink basin and the sedimentation basin is operably positioned within the sink basin.

* * * * *